United States Patent
Morris

(10) Patent No.: US 7,577,507 B2
(45) Date of Patent: Aug. 18, 2009

(54) DRIVELINE LASH ESTIMATION AND CLUNK MANAGEMENT USING MULTIVARIABLE ACTIVE DRIVELINE DAMPING

(75) Inventor: Robert L. Morris, Milford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 547 days.

(21) Appl. No.: 11/386,527

(22) Filed: Mar. 22, 2006

(65) Prior Publication Data

US 2007/0225888 A1 Sep. 27, 2007

(51) Int. Cl.
*B60K 41/01* (2006.01)
*G06F 19/00* (2006.01)

(52) U.S. Cl. ............................. 701/51; 701/22; 701/85; 180/65.2

(58) Field of Classification Search .................... 701/51, 701/22, 54, 85, 87; 180/65.2, 65.4; 123/350, 123/361; 477/107, 110, 3; 475/204
See application file for complete search history.

(56) References Cited

U.S. PATENT DOCUMENTS

| | | | |
|---|---|---|---|
| 5,325,740 A | 7/1994 | Zhang et al. | |
| 6,188,943 B1 | 2/2001 | Uchida et al. | |
| 6,266,597 B1 | 7/2001 | Russell et al. | |
| 6,543,414 B2 | 4/2003 | O'Neil et al. | |
| 6,574,535 B1* | 6/2003 | Morris et al. | ................. 701/22 |
| 7,425,187 B2* | 9/2008 | Doering | ..................... 477/107 |
| 2001/0004722 A1* | 6/2001 | Kotwicki et al. | ............. 701/54 |
| 2005/0054482 A1* | 3/2005 | Doering et al. | ............ 477/107 |
| 2007/0213909 A1* | 9/2007 | Doering et al. | ............... 701/54 |

* cited by examiner

*Primary Examiner*—Tan Q Nguyen

(57) ABSTRACT

Driveline lash and clunk are controlled in a powertrain system having multiple torque-generative and torque control devices using a multivariable feedback control approach to provide active driveline damping. Control parameters used by a state estimator are different, depending on whether the driveline lash is taken up or is currently slack. When the estimated driveline axle torque is not substantially zero, the nominal parameters for transmission mode or gear are used in the state estimator. When the estimated axle torque is substantially zero, the parameters are switched to neutral parameters, the lash estimator indicates neutral lash state, and angle of lash is tracked until it accumulates an expected amount of lash in the driveline. During a lash transition time, active damping controls the driveline component speeds so that the effect of lash take-up is minimized. After lash take-up occurs, desired axle torque is used by the system.

22 Claims, 6 Drawing Sheets

DRIVELINE LASH ESTIMATION AND CLUNK MANAGEMENT USING MULTIVARIABLE ACTIVE DRIVELINE DAMPING

TECHNICAL FIELD

This invention pertains generally to hybrid powertrain control systems, and more specifically to controlling driveline lash and clunk management by simultaneously controlling multiple torque inputs.

BACKGROUND OF THE INVENTION

Various hybrid powertrain architectures are known for managing the input and output torques of various prime-movers in hybrid vehicles, most commonly internal combustion engines and electric machines. Series hybrid architectures are generally characterized by an internal combustion engine driving an electric generator which in turn provides electrical power to an electric drivetrain and to a battery pack. The internal combustion engine in a series hybrid is not directly mechanically coupled to the drivetrain. The electric generator may also operate in a motoring mode to provide a starting function to the internal combustion engine, and the electric drivetrain may recapture vehicle braking energy by operating in a generator mode to recharge the battery pack. Parallel hybrid architectures are generally characterized by an internal combustion engine and an electric motor which both have a direct mechanical coupling to the drivetrain. The drivetrain conventionally includes a shifting transmission to provide the preferable gear ratios for wide range operation.

One hybrid powertrain architecture comprises a two-mode, compound-split, electro-mechanical transmission which utilizes an input member for receiving power from a prime mover power source and an output member for delivering power from the transmission. First and second electrical machines are operatively connected to an energy storage device for interchanging electrical power between the storage device and the electrical machines. A control unit is provided for regulating the electrical power interchange between the energy storage device and the electrical machines. The control unit also regulates electrical power interchange between the electrical machines.

Engineers have a challenge in managing transitions in operating states of hybrid powertrain systems to minimize effect on vehicle driveability caused by driveline lash, or play, in the entire gear train. Actions wherein driveline torque is transitioned from a positive torque to a negative torque, or from a neutral torque to a positive or negative torque can result in gear lash, clunks, i.e. audible noise, and jerks, as slack is taken out of the driveline and driveline components impact one another. Excessive gear lash, clunks, jerks, and other related events may result in operator dissatisfaction, and can negatively affect powertrain and transmission reliability and durability.

Gear lash, clunks, and jerks have the potential to occur during vehicle operations including: when the operator changes transmission gears, e.g. from neutral/park to drive or reverse; when the operator tips into or out of the throttle; or when the vehicle is operated on an inclined surface. Lash action occurs, for example, as follows: Torque-generative devices of the powertrain exert a positive torque onto the transmission input gears to drive the vehicle through the driveline. During a subsequent deceleration, torque input to the powertrain and driveline decreases, and gears in the transmission and driveline separate. After passing through a zero-torque point, the gears reconnect to transfer torque, in the form of motor braking, electrical generation, and others. The reconnection of the gears to transfer torque result in gear impact, with resulting clunks and jerks.

Hybrid powertrain systems such as the exemplary two-mode, compound-split, electro-mechanical transmission have multiple torque-generative devices. Coordinated control of the torque-generative devices is required to reduce driveline gear lash, clunks, and jerks. Additionally, the exemplary hybrid powertrain system introduces a challenge of managing driveline transitions which may occur when one of the motor/generators transitions from operating in a motoring mode to operating in a generating mode.

Therefore, there is a need for a control scheme for hybrid powertrain systems such as the exemplary two-mode, compound-split, electro-mechanical transmission having multiple torque-generative devices which addresses the aforementioned issues related to driveline gear lash and clunks. This includes a scheme that is cognizant of driveline torque transitions which may occur when one of the torque-generative devices comprises an electrical machine which transitions between operating in a motoring mode and operating in a generating mode. There is a further need to develop a hybrid powertrain control system which can coordinate and manage power from the torque-generative devices in a manner which effectively uses on-board computing resources.

SUMMARY OF THE INVENTION

The invention provides driveline lash information for a multivariable feedback control approach to provide active driveline damping and clunk management for a hybrid powertrain system, and other powertrain systems using multiple torque-generative and torque control devices.

The parameters used by the state estimator depend upon whether the driveline lash is taken up, i.e. torque is being transmitted through the driveline, or the driveline lash is currently slack, or neutral. When magnitude of the estimated driveline axle torque is a value not substantially equal to zero torque value, or neutral, the nominal parameters for the appropriate mode or gear are used in the state estimator and the lash estimator indicates either a positive or a negative lash state. When the magnitude of the estimated axle torque is substantially zero, the parameters are switched to neutral lash parameters, the lash estimator indicates neutral lash state, and the angle of lash is tracked until the angle accumulates the expected amount of lash in the driveline. At this point, the lash estimator again indicates positive or negative lash.

To manage clunk the desired axle torque is restricted when a torque reversal occurs. If the vehicle operator or the system executes a command that requires the system to change from a positive torque to a negative torque, or a negative torque to a positive torque, the desired axle torque during the reversal is limited to a low level until the lash estimate has changed accordingly, i.e. from positive to negative, or negative to positive. During this transition time, active damping controls the response of the driveline component speeds so that the effect of lash take-up is minimized. After lash take-up occurs, the desired axle torque can proceed without restriction to the operator or system command.

Therefore, in accordance with the present invention, a method and article of manufacture for controlling torque transmitted between a powertrain system and a driveline are offered. The powertrain system preferably comprises a plurality of torque-generative devices operably connected to a transmission. The method comprises determining a driveline axle torque, an output speed of the powertrain, and, an output speed of a driven wheel of the driveline. A lash state is determined, and each of the torque-generative devices is controlled based upon the lash state.

An aspect of the invention comprises determining the lash state to be one of a positive state, a negative state, and a neutral state, based upon the driveline axle torque and the output speeds of the powertrain and the driven wheel of the driveline.

Another aspect of the invention comprises determining the lash state to be a neutral state based upon the driveline axle torque further comprises determining the lash state to be the neutral state when the driveline axle torque is substantially equal to a nil torque value.

Another aspect of the invention comprises controlling the torque-generative devices such that a rate of change of torque transmitted between the powertrain system and the driveline is less than an operator-commanded rate of change of driveline torque when the lash state is neutral.

Another aspect of the invention comprises controlling the torque-generative devices such that the torque transmitted between the powertrain system and the driveline is less than an operator-commanded torque for a period of time.

Another aspect of the invention comprises controlling the torque-generative devices based upon the lash state, which further comprises selecting a gain matrix for a multivariate feedback control system operable to control each of the torque-generative devices based upon the lash state. This preferably includes selecting the gain matrix for the multivariate feedback control system operable to control the plurality of torque-generative devices such that torque transmitted between the powertrain system and the driveline is less than an operator-commanded torque when the lash state is neutral. This preferably includes controlling the torque-generative devices such that the torque transmitted between the powertrain system and the driveline is less than the operator-commanded torque for a period of time.

Another aspect of the invention comprises monitoring powertrain torque transmitted between the powertrain system and the driveline by measuring torque with a sensor, and determining output speed of the driven wheel comprises measuring wheel speed with a sensor.

Another aspect of the invention comprises monitoring powertrain torque transmitted between the powertrain system and the driveline by estimating torque transmitted to the driveline. Alternatively, determining output speed of the driven wheel further comprises measuring wheel speeds of a plurality of driven wheels, and determining an average value for wheel speed therefrom.

The invention further comprises determining an axle torque by estimating axle torque based upon the output speeds of the powertrain and the driven wheel.

Another aspect of the invention comprises estimating the output speed of the transmission of the powertrain and the output speed of the driven wheel based upon measured operating parameters.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
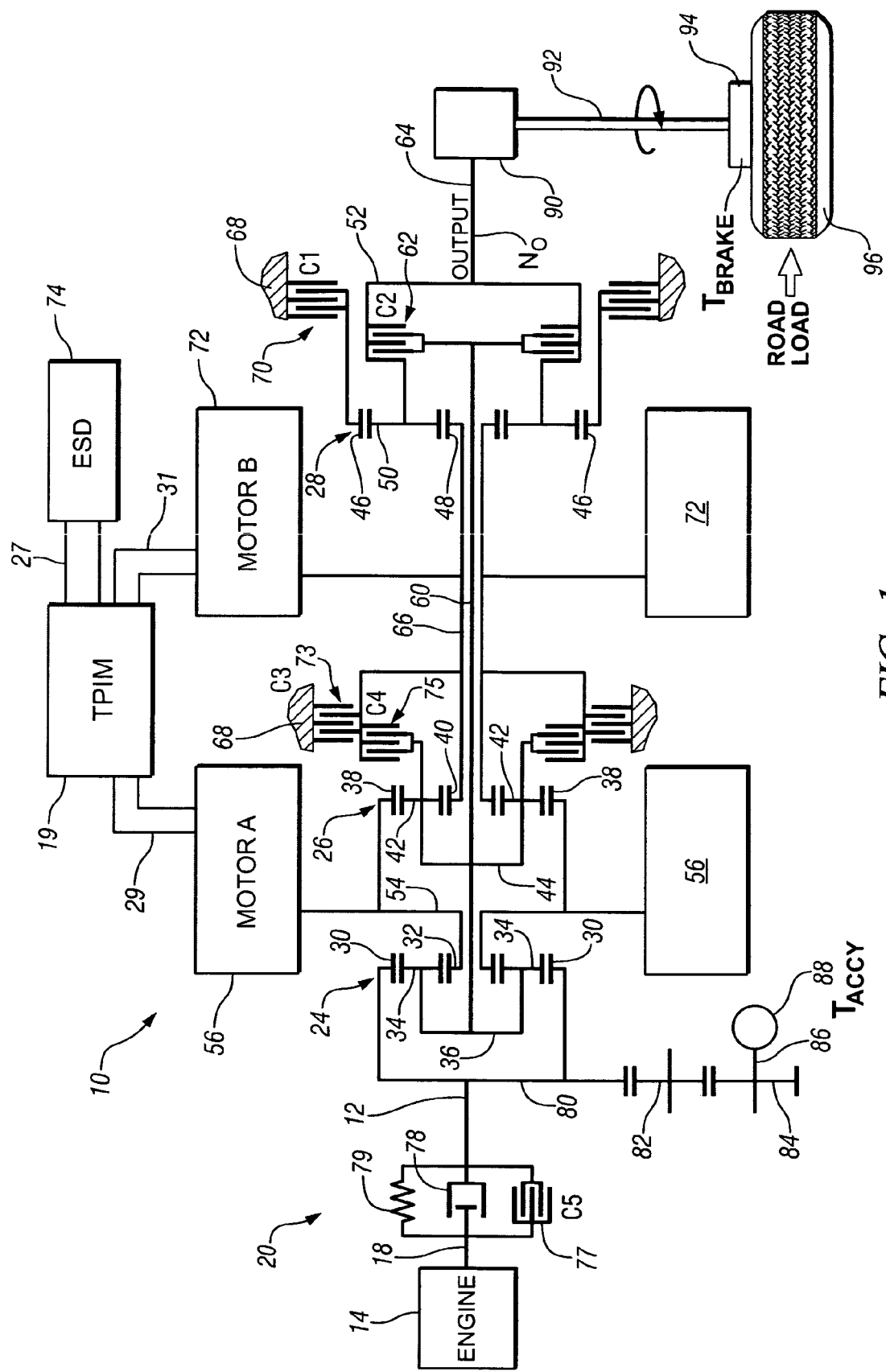
FIG. 1 is a schematic diagram of an exemplary powertrain, in accordance with the present invention.
Figure 2:
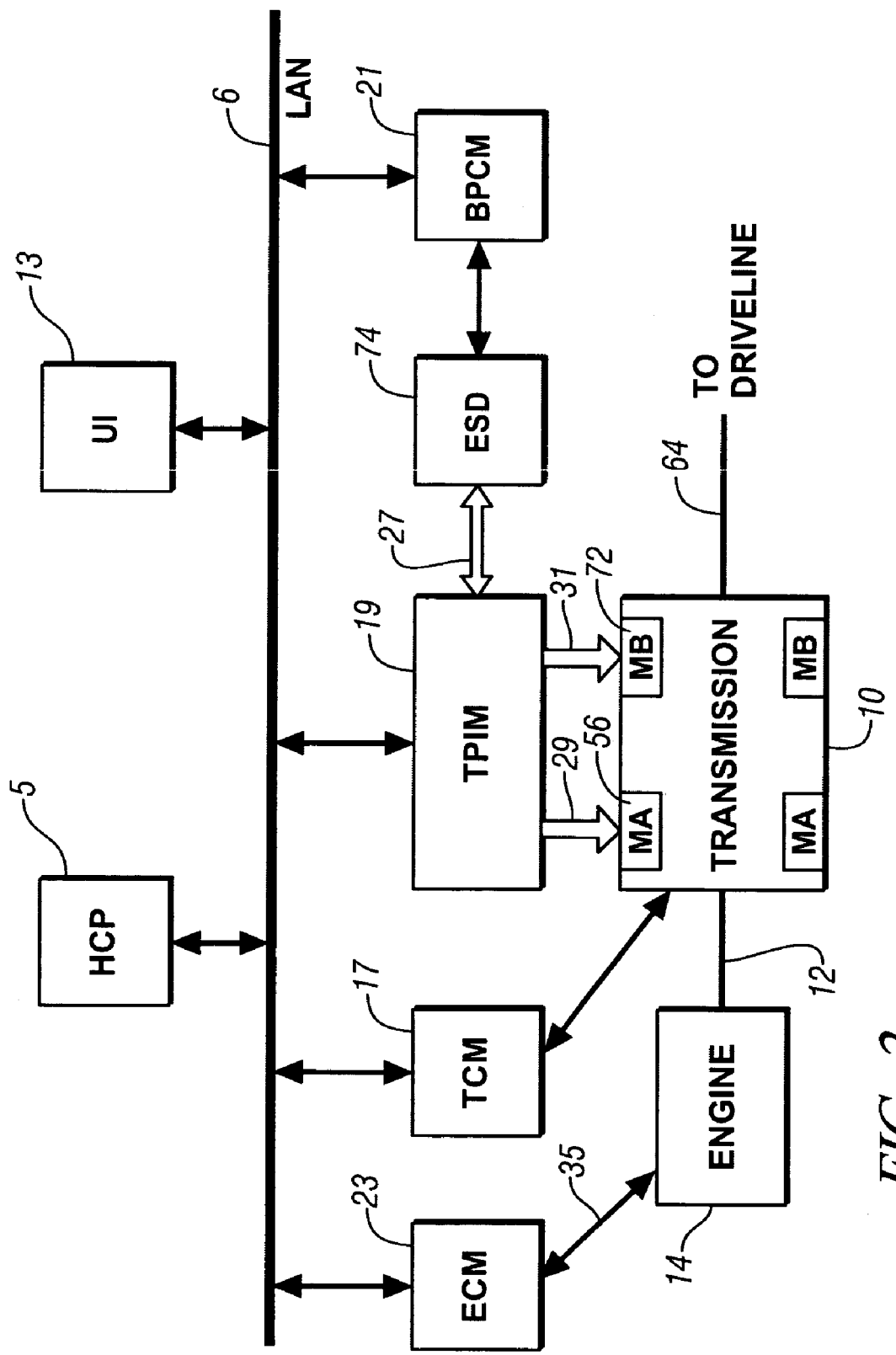
FIG. 2 is a schematic diagram of an exemplary control architecture and powertrain, in accordance with the present invention.

Referring now to the drawings, wherein the showings are for the purpose of illustrating the invention only and not for the purpose of limiting the same, FIGS. 1 and 2 show a system comprising an engine 14, transmission 10, control system, and driveline which has been constructed in accordance with an embodiment of the present invention.

Mechanical aspects of exemplary transmission 10 are disclosed in detail in commonly assigned U.S. Patent application Publication Ser. No. U.S. 2005/0137042 A1, published Jun. 23, 2005, entitled Two-Mode, Compound-Split, Hybrid Electro-Mechanical Transmission having Four Fixed Ratios, which is incorporated herein by reference. The exemplary two-mode, compound-split, electro-mechanical hybrid transmission embodying the concepts of the present invention is depicted in FIG. 1, and is designated generally by the numeral 10. The hybrid transmission 10 has an input member 12 that may be in the nature of a shaft which may be directly driven by an engine 14. A transient torque damper 20 is incorporated between the output shaft 18 of the engine 14 and the input member 12 of the hybrid transmission 10. The transient torque damper 20 preferably comprises a torque transfer device 77 having characteristics of a damping mechanism and a spring, shown respectively as 78 and 79. The transient torque damper 20 permits selective engagement of the engine 14 with the hybrid transmission 10, but it must be understood that the torque transfer device 77 is not utilized to change, or control, the mode in which the hybrid transmission 10 operates. The torque transfer device 77 preferably comprises a hydraulically operated friction clutch, referred to as clutch C5.

The engine 14 may be any of numerous forms of internal combustion engines, such as a spark-ignition engine or a compression-ignition engine, readily adaptable to provide a power output to the transmission 10 at a range of operating speeds, from idle, at or near 600 revolutions per minute (RPM), to over 6,000 RPM. Irrespective of the means by which the engine 14 is connected to the input member 12 of the transmission 10, the input member 12 is connected to a planetary gear set 24 in the transmission 10.

Referring specifically now to FIG. 1, the hybrid transmission 10 utilizes three planetary-gear sets 24, 26 and 28. The first planetary gear set 24 has an outer gear member 30 that may generally be designated as a ring gear, which circumscribes an inner gear member 32, generally designated as a sun gear. A plurality of planetary gear members 34 are rotatably mounted on a carrier 36 such that each planetary gear member 34 meshingly engages both the outer gear member 30 and the inner gear member 32.

The second planetary gear set 26 also has an outer gear member 38, generally designated as a ring gear, which circumscribes an inner gear member 40, generally designated as a sun gear. A plurality of planetary gear members 42 are rotatably mounted on a carrier 44 such that each planetary gear 42 meshingly engages both the outer gear member 38 and the inner gear member 40.

The third planetary gear set 28 also has an outer gear member 46, generally designated as a ring gear, which circumscribes an inner gear member 48, generally designated as a sun gear. A plurality of planetary gear members 50 are rotatably mounted on a carrier 52 such that each planetary gear 50 meshingly engages both the outer gear member 46 and the inner gear member 48.

Ratios of teeth on ring gears/sun gears are typically based upon design considerations known to skilled practitioners and outside the scope of the present invention. By way of example, in one embodiment, the ring gear/sun gear tooth ratio of the planetary gear set 24 is 65/33; the ring gear/sun gear tooth ratio of the planetary gear set 26 is 65/33; and the ring gear/sun gear tooth ratio of the planetary gear set 28 is 94/34.

The three planetary gear sets 24, 26 and 28 each comprise simple planetary gear sets. Furthermore, the first and second planetary gear sets 24 and 26 are compounded in that the inner gear member 32 of the first planetary gear set 24 is conjoined, as through a hub plate gear 54, to the outer gear member 38 of the second planetary gear set 26. The conjoined inner gear member 32 of the first planetary gear set 24 and the outer gear member 38 of the second planetary gear set 26 are continuously connected to a first motor/generator 56, also referred to as 'Motor A'.

The planetary gear sets 24 and 26 are further compounded in that the carrier 36 of the first planetary gear set 24 is conjoined, as through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, as through a torque transfer device 62 which, as will be hereinafter more fully explained, is employed to assist in the selection of the operational modes of the hybrid transmission 10. The carrier 52 of the third planetary gear set 28 is connected directly to the transmission output member 64.

In the embodiment described herein, wherein the hybrid transmission 10 is used in a land vehicle, the output member 64 is operably connected to a driveline comprising a gear box 90 or other torque transfer device which provides a torque output to one or more vehicular axles 92 or half-shafts (not shown). The axles 92, in turn, terminate in drive members 96. The drive members 96 may be either front or rear wheels of the vehicle on which they are employed, or they may be a drive gear of a track vehicle. The drive members 96 may have some form of wheel brake 94 associated therewith. The drive members each have a speed parameter, $N_{WHL}$, comprising rotational speed of each wheel 96 which is typically measurable with a wheel speed sensor.

The inner gear member 40 of the second planetary gear set 26 is connected to the inner gear member 48 of the third planetary gear set 28, as through a sleeve shaft 66 that circumscribes shaft 60. The outer gear member 46 of the third planetary gear set 28 is selectively connected to ground, represented by the transmission housing 68, through a torque transfer device 70. Torque transfer device 70, as is also hereinafter explained, is also employed to assist in the selection of the operational modes of the hybrid transmission 10. The sleeve shaft 66 is also continuously connected to a second motor/generator 72, also referred to as 'Motor B'.

All the planetary gear sets 24, 26 and 28 as well as the two motor/generators 56 and 72 are coaxially oriented, as about the axially disposed shaft 60. Motor/generators 56 and 72 are both of an annular configuration which permits them to circumscribe the three planetary gear sets 24, 26 and 28 such that the planetary gear sets 24, 26 and 28 are disposed radially inwardly of the motor/generators 56 and 72. This configuration assures that the overall envelope, i.e., the circumferential dimension, of the transmission 10 is minimized.

A torque transfer device 73 selectively connects the sun gear 40 with ground, i.e., with transmission housing 68. A torque transfer device 75 is operative as a lock-up clutch, locking planetary gear sets 24, 26, motors 56, 72 and the input to rotate as a group, by selectively connecting the sun gear 40 with the carrier 44. The torque transfer devices 62, 70, 73, 75 are all friction clutches, respectively referred to as follows: clutch C1 70, clutch C2 62, clutch C3 73, and clutch C4 75. Each clutch is preferably hydraulically actuated, receiving pressurized hydraulic fluid from a pump. Hydraulic actuation is accomplished using a known hydraulic fluid circuit, which is not described in detail herein.

The hybrid transmission 10 receives input motive torque from a plurality of torque-generative devices, including the engine 14 and the motors/generators 56 and 72, as a result of energy conversion from fuel or electrical potential stored in an electrical energy storage device (ESD) 74. The ESD 74 typically comprises one or more batteries. Other electrical energy and electrochemical energy storage devices that have the ability to store electric power and dispense electric power may be used in place of the batteries without altering the concepts of the present invention. The ESD 74 is preferably sized based upon factors including regenerative requirements, application issues related to typical road grade and temperature, and propulsion requirements such as emissions, power assist and electric range. The ESD 74 is high voltage DC-coupled to transmission power inverter module (TPIM) 19 via DC lines or transfer conductors 27. The TPIM 19 is an element of the control system described hereinafter with regard to FIG. 2. The TPIM 19 communicates with the first motor/generator 56 by transfer conductors 29, the TPIM 19 similarly communicates with the second motor/generator 72 by transfer conductors 31. Electrical current is transferable to or from the ESD 74 in accordance with whether the ESD 74 is being charged or discharged. TPIM 19 includes the pair of power inverters and respective motor controllers configured to receive motor control commands and control inverter states therefrom for providing motor drive or regeneration functionality.

In motoring control, the respective inverter receives current from the DC lines and provides AC current to the respective motor over transfer conductors 29 and 31. In regeneration control, the respective inverter receives AC current from the motor over transfer conductors 29 and 31 and provides current to the DC lines 27. The net DC current provided to or from the inverters determines the charge or discharge operating mode of the electrical energy storage device 74. Preferably, Motor A 56 and Motor B 72 are three-phase AC machines and the inverters comprise complementary three-phase power electronics.

Referring again to FIG. 1, a drive gear 80 may be presented from the input member 12. As depicted, the drive gear 80 fixedly connects the input member 12 to the outer gear member 30 of the first planetary gear set 24, and the drive gear 80, therefore, receives power from the engine 14 and/or the motor/generators 56 and/or 72 through planetary gear sets 24 and/or 26. The drive gear 80 meshingly engages an idler gear 82 which, in turn, meshingly engages a transfer gear 84 that is secured to one end of a shaft 86. The other end of the shaft 86 may be secured to a hydraulic/transmission fluid pump and/or power take-off ('PTO') unit, designated either individually or collectively at 88, and comprise an accessory load.

Referring now to FIG. 2, a schematic block diagram of the control system, comprising a distributed controller architecture, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and motors 56, 72. The distributed controller architecture includes engine control module ('ECM') 23, transmission control module ('TCM') 17, battery pack control module ('BPCM') 21, and Transmission Power Inverter Module ('TPIM') 19. A hybrid control module ('HCP') 5 provides overarching control and coordination of the aforementioned controllers. There is a User Interface ('UI') 13 operably connected to a plurality of devices through which a vehicle operator typically controls or directs operation of the powertrain, including the transmission 10. Exemplary vehicle operator inputs to the UI 13 include an accelerator pedal, a brake pedal, transmission gear selector, and, vehicle speed cruise control. Each of the aforementioned controllers communicates with other controllers, sensors, and actuators via a local area network ('LAN') bus 6. The LAN bus 6 allows for structured communication of control parameters and commands between the various controllers. The specific communication protocol utilized is application-specific. By way of example, one communications protocol is the Society of Automotive Engineers standard J1939. The LAN bus and appropriate protocols provide for robust messaging and multi-controller interfacing between the aforementioned controllers, and other controllers providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, the HCP 5 generates various commands, including: an engine torque command, $T_{E\_CMD}$; clutch torque commands, $T_{CL\_N}$ for the various clutches C1, C2, C3, C4 of the hybrid transmission 10; and motor torque commands, $T_{A\_CMD}$ and $T_{B\_CMD}$, for the electrical motors A and B, respectively.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine torque command, $T_{E\_CMD}$, from the HCP 5, and generates a desired axle torque, $T_{AXLE\_DES}$, and an indication of actual engine torque, $T_E$, which is communicated to the HCP 5. For simplicity, ECM 23 is shown generally having bi-directional interface with engine 14 via aggregate line 35. Various other parameters that may be sensed by ECM 23 include engine coolant temperature, engine input speed ($N_E$) to a shaft leading to the transmission, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques, $T_{CL\_N\_EST}$, for each of the clutches C1, C2, C3, and, C4 and rotational speed, $N_O$, of the output shaft 64. Other actuators and sensors may be used to provide additional information from the TCM to the HCP for control purposes.

The BPCM 21 is signally connected one or more sensors operable to monitor electrical current or voltage parameters of the ESD 74 to provide information about the state of the batteries to the HCP 5. Such information includes battery state-of-charge, Bat_SOC, and other states of the batteries, including voltage, $V_{BAT}$, and available power, $P_{BAT\_MIN}$ and $P_{BAT\_MAX}$.

The Transmission Power Inverter Module (TPIM) 19 includes a pair of power inverters and motor controllers configured to receive motor control commands and control inverter states therefrom to provide motor drive or regeneration functionality. The TPIM 19 is operable to generate torque commands for Motors A and B, $T_{A\_CMD}$ and $T_{B\_CMD}$, based upon input from the HCP 5, which is driven by operator input through UI 13 and system operating parameters. The predetermined torque commands for Motors A and B, $T_{A\_CMD}$ and $T_{B\_CMD}$, are adjusted with motor damping torques, $T_{A\_DAMP}$ and $T_{B\_DAMP}$, to determine motor torques, $T_A$ and $T_B$, which are implemented by the control system, including the TPIM 19, to control the Motors A and B. Individual motor speed signals, $N_A$ and $N_B$ for Motor A and Motor B respectively, are derived by the TPIM 19 from the motor phase information or conventional rotation sensors. The TPIM 19 determines and communicates motor speeds, $N_A$ and $N_B$, to the HCP 5. The electrical energy storage device 74 is high-voltage DC-coupled to the TPIM 19 via DC lines 27. Electrical current is transferable to or from the TPIM 19 in accordance with whether the ESD 74 is being charged or discharged.

Each of the aforementioned controllers is preferably a general-purpose digital computer generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the controllers are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3, 6.25, 15, 25 and 100 milliseconds during ongoing engine and vehicle operation. Alternatively, algorithms may be executed in response to occurrence of an event.

In response to an operator's action, as captured by the UI 13, the supervisory HCP controller 5 and one or more of the other controllers determine required transmission output torque, $T_O$. Selectively operated components of the hybrid transmission 10 are appropriately controlled and manipulated to respond to the operator demand. For example, in the exemplary embodiment shown in FIGS. 1 and 2, when the operator has selected a forward drive range and manipulates either the accelerator pedal or the brake pedal, the HCP 5 determines an output torque for the transmission, which affects how and when the vehicle accelerates or decelerates. Final vehicle acceleration is affected by other factors, including, e.g., road load, road grade, and vehicle mass. The HCP 5 monitors the parametric states of the torque-generative devices, and determines the output of the transmission required to arrive at the desired torque output. Under the direction of the HCP 5, the transmission 10 operates over a range of output speeds from slow to fast in order to meet the operator demand.

The two-mode, compound-split, electro-mechanical hybrid transmission, includes output member 64 which receives output power through two distinct gear trains within the transmission 10, and operates in several transmission operating modes, described with reference now to FIG. 1, and Table 1, below.

TABLE 1

| Transmission Operating Mode | Actuated Clutches | |
| --- | --- | --- |
| Mode I | C1 70 | |
| Fixed Ratio 1 | C1 70 | C4 75 |
| Fixed Ratio 2 | C1 70 | C2 62 |
| Mode II | C2 62 | |
| Fixed Ratio 3 | C2 62 | C4 75 |
| Fixed Ratio 4 | C2 62 | C3 73 |

The various transmission operating modes described in the table indicate which of the specific clutches C1, C2, C3, and C4 are engaged or actuated for each of the operating modes. Additionally, in various transmission operating modes, Motor A 56 or Motor B 72 may each operate as electrical motors, designated as MA, MB respectively, and whether Motor A 56 is operating as a generator, designated as GA. A first mode, or gear train, is selected when the torque transfer device 70 is actuated in order to "ground" the outer gear member 46 of the third planetary gear set 28. A second mode, or gear train, is selected when the torque transfer device 70 is released and the torque transfer device 62 is simultaneously actuated to connect the shaft 60 to the carrier 52 of the third planetary gear set 28. Other factors outside the scope of the invention affect when the electrical machines 56, 72 operate as motors and generators, and are not discussed herein.

The control system, shown primarily in FIG. 2, is operable to provide a range of transmission output speeds, $N_O$, of shaft 64 from relatively slow to relatively fast within each mode of operation. The combination of two modes with a slow-to-fast output speed range in each mode allows the transmission 10 to propel a vehicle from a stationary condition to highway speeds, and meet various other requirements as previously described. Additionally, the control system coordinates operation of the transmission 10 so as to allow synchronized shifts between the modes.

The first and second modes of operation refer to circumstances in which the transmission functions are controlled by one clutch, i.e. either clutch C1 62 or C2 70, and by the controlled speed and torque of the motor/generators 56 and 72. Certain ranges of operation are described below in which fixed ratios are achieved by applying an additional clutch. This additional clutch may be clutch C3 73 or C4 75, as shown in the table, above.

When the additional clutch is applied, fixed ratio of input-to-output speed of the transmission, i.e. $N_I/N_O$, is achieved. The rotations of the motor/generators 56, 72 are dependent on internal rotation of the mechanism as defined by the clutching and proportional to the input speed, $N_I$, determined or measured at shaft 12. The motor/generators function as motors or generators. They are completely independent of engine to output power flow, thereby enabling both to be motors, both to function as generators, or any combination thereof. This allows, for instance, during operation in Fixed Ratio 1 that motive power output from the transmission at shaft 64 is provided by power from the engine and power from Motors A and B, through planetary gear set 28 by accepting power from the energy storage device 74.

The transmission operating mode can be switched between Fixed Ratio operation and Mode operation by activating or deactivating one the additional clutches during Mode I or Mode II operation. Determination of operation in fixed ratio or mode control is by algorithms executed by the control system, and is outside the scope of this invention.

The modes of operation may overlap the ratio of operation, and selection depends again on the driver's input and response of the vehicle to that input. RANGE 1 falls primarily within mode I operation when clutches C1 70 and C4 75 are engaged. RANGE 2 falls within mode I and mode II when clutches C2 62 and C1 70 are engaged. A third fixed ratio range is available primarily during mode II when clutches C2 62 and C4 75 are engaged, and a fourth fixed ratio range is available during mode II when clutches C2 62 and C3 73 are engaged. It is notable that ranges of operation for Mode I and Mode II typically overlap significantly.

Output of the exemplary powertrain system described hereinabove is constrained due to mechanical and system limitations. The output speed, $N_O$, of the transmission measured at shaft 64 is limited due to limitations of engine output speed, $N_E$, measured at shaft 18, and transmission input speed, $N_I$, measured at shaft 12, and speed limitations of the electric Motors A and B, designated as $+/- N_A$, $+/- N_B$. Output torque, $T_O$, of the transmission 64 is similarly limited due to limitations of the engine input torque, $T_E$, and input torque, $T_I$, measured at shaft 12 after the transient torque damper 20, and torque limitations ($T_{A\_MAX}$, $T_{A\_MIN}$, $T_{B\_MAX}$, $T_{B\_MIN}$) of the Motors A and B 56, 72.

Figure 3:
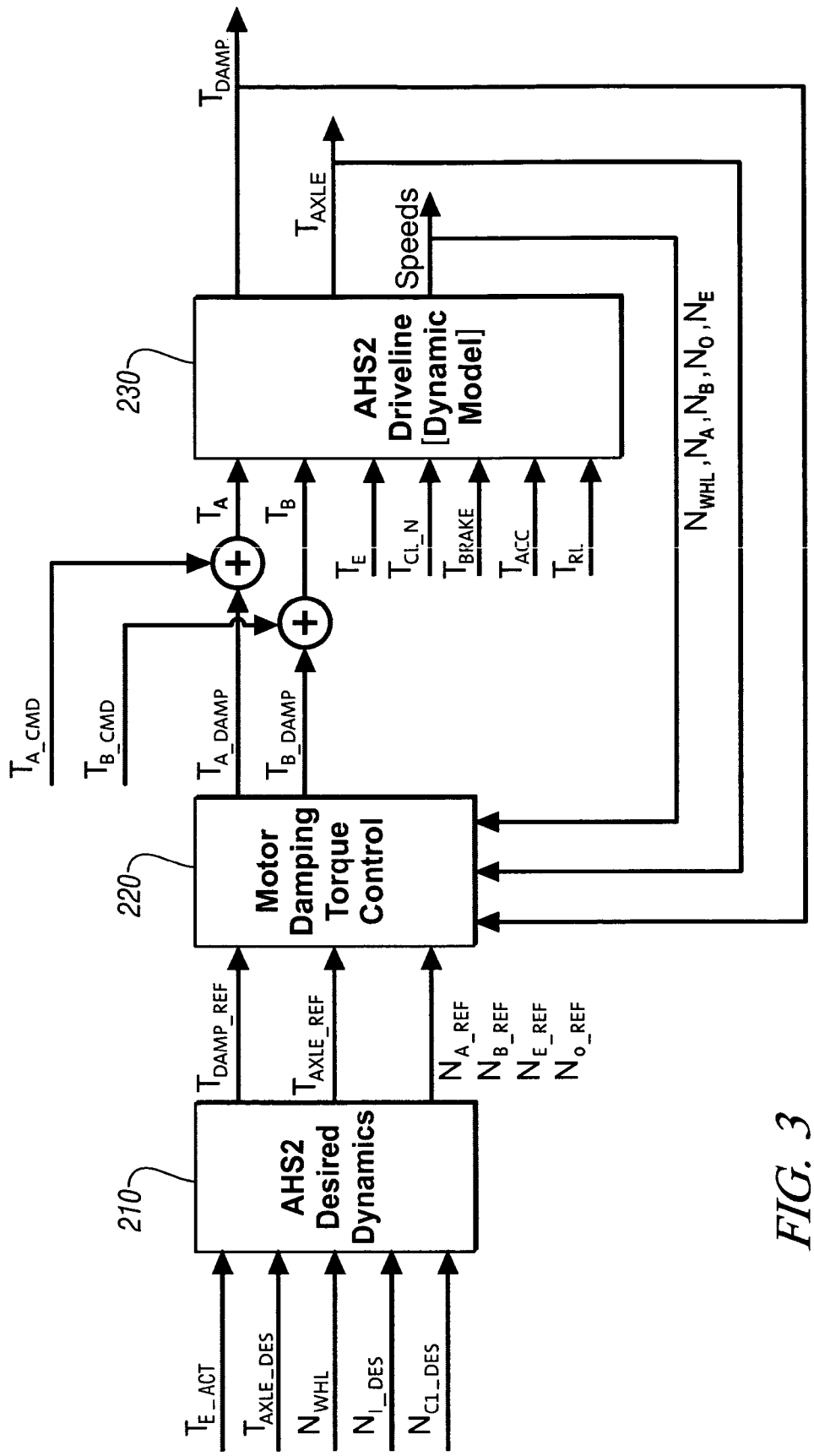
FIGS. 3, 4, and 5 are schematic information flow diagrams, in accordance with the present invention; and, FIGS. 6 and 7 are representative data graphs, in accordance with the present invention.

Referring now to FIG. 3, a control scheme is shown, comprising a multivariate feedback control system preferably executed as algorithms in the controllers of the control system described hereinabove with reference to FIG. 2, to control operation of the system described with reference to FIG. 1. The control scheme described hereinafter comprises a subset of overall vehicle control architecture. The control scheme comprises a method and apparatus for multivariate active driveline damping. An exemplary method and apparatus for multivariate active driveline damping is described in commonly assigned and co-pending U.S. Ser. No. 11/386,337 entitled METHOD AND APPARATUS FOR MULTIVARIATE ACTIVE DRIVELINE DAMPING. The aforementioned method and apparatus are incorporated herein by reference so that multivariate active driveline damping need not be described in detail. The exemplary multivariate feedback control method and system comprises basic elements for controlling torque outputs from the torque-generative devices 14, 56, 72 through the transmission 10 to the driveline. This includes the overall control elements of determining desired operating state parameters for the powertrain system and the driveline, which comprise inputs to the desired dynamics segment 210. Outputs of the desired dynamics segment 210 comprise a plurality of reference values for axle torque, $T_{AXLE\_REF}$; for damper torque, $T_{DAMP\_REF}$; and various speeds, $N_{A\_REF}$, $N_{B\_REF}$, $N_{O\_REF}$, $N_{E\_REF}$, $N_{WHL\_REF}$. The reference values and the and a plurality of operating state errors calculated from outputs of the driveline comprise inputs to a motor damping torque control scheme 220. The motor damping torque control scheme 220 is executed to determine damping torques to the torque-generative devices, in this embodiment to Motors A and B, i.e. $T_{A\_DAMP}$ and $T_{B\_DAMP}$. Driveline dynamic control, shown as 230, comprises controlling inputs to each torque-generative device and other torque devices in the transmission and driveline, based upon the operating state errors and, the reference states.

Figure 4:
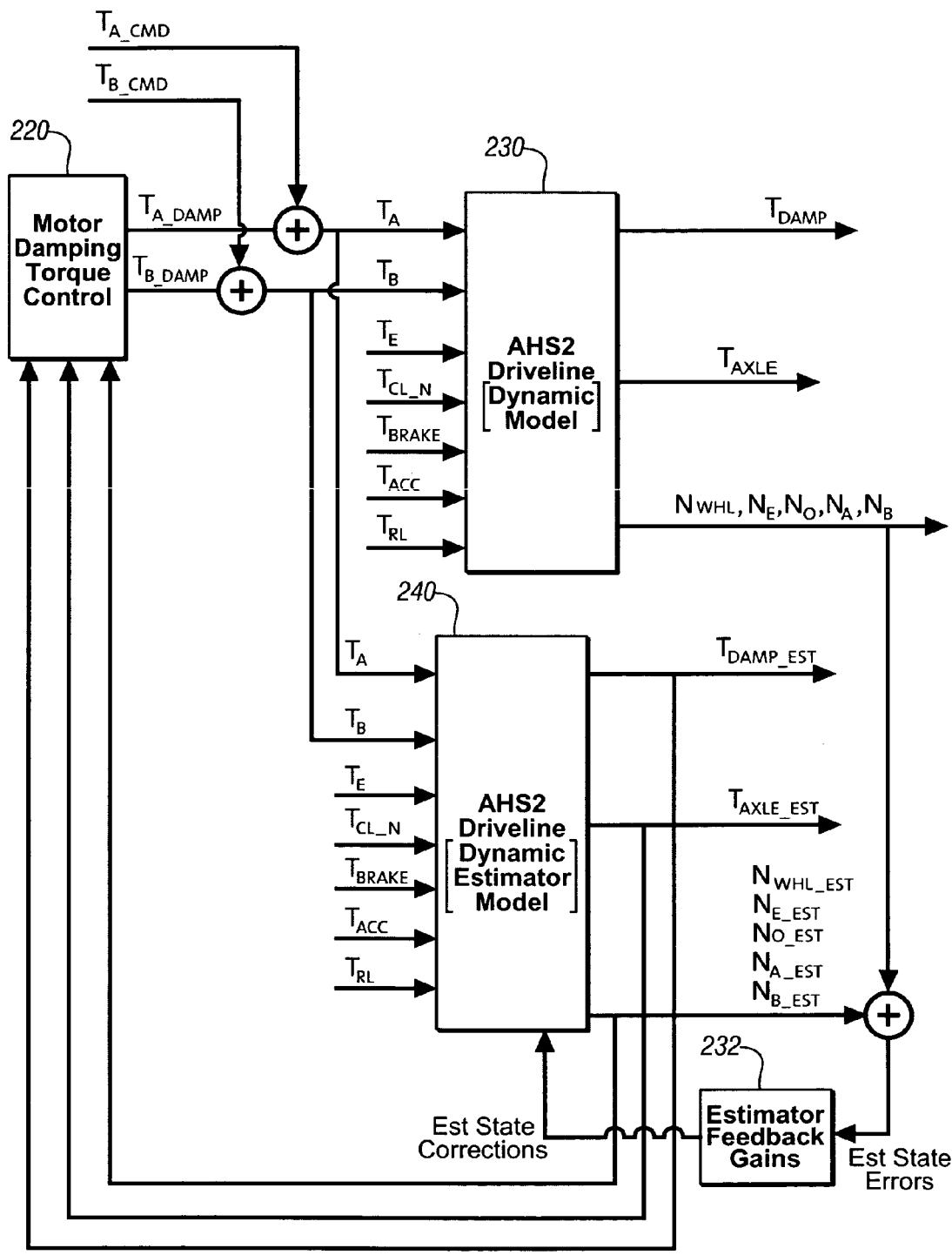

Referring now to FIG. 4, the method and apparatus for estimating state parameters for multivariate driveline having a driveline dynamics estimator 240, is shown. An exemplary method and apparatus for multivariate active driveline damping is described in commonly assigned and co-pending U.S. Ser. No. 111/386,262 entitled PARAMETER STATE ESTIMATION. In overall operation, the driveline dynamics estimator 240 is a mathematical model comprising a plurality of linear equations executed as algorithms within one of the controllers. The mathematical model equations, including calibration values, are executed using algorithms to model representations of operation of the exemplary driveline described with reference to FIGS. 1 and 2, taking into account application-specific masses, inertias, friction factors, and other characteristics and parameters of the driveline that affect various operating states. The method to estimate state parameters for the aforementioned powertrain system includes monitoring operating rotational speed for each of the torque-generative devices, in this case Motor A 56, Motor B 72, and engine 14. The engine output speed, $N_E$, is measured at shaft 18, and transmission input speed, $N_I$, is measured at shaft 12. Output rotational speed, No, of the transmission 10 at shaft 64 is measured. Torque commands from the control system to the torque-generative devices are determined and referred to as $T_A$, $T_B$, and $T_E$. A plurality of driveline torque loads are also determined and used as input. The aforementioned mathematical model equations are executed in one of the controllers to estimate each state parameter, including $T_{DAMP}$, $T_{AXLE}$, $N_A$, $N_B$, $N_O$, $N_E$, $N_{WHL}$, using as inputs: the operating speed for each of the torque-generative devices, the output speed of the transmission device, the torque commands to the torque-generative devices, and the torque loads. The distributed controller architecture described with reference to FIG. 2, and the algorithmic structure described herein is executed in a manner that causes estimation of the aforementioned state parameters to be achieved in real-time, i.e. calculation of each estimated state occurs during a single clock cycle of the controller so there is limited or no lag time in determining the various states, thus eliminating or minimizing potential for loss of control of the system. Input parameters to the driveline dynamics estimator 240 include motor torque values, $T_A$ and $T_B$, engine torque $T_E$, clutch torques $T_{CL\_N}$, to clutches C1, C2, C3, C4, brake torque $T_{BRAKE}$, accessory load $T_{ACC}$, and road load, $T_{RL}$, and the transmission operating mode. The mathematical model equations are applied to the aforementioned inputs to dynamically calculate estimated output state parameters of the driveline, including $T_{DAMP\_EST}$, $T_{AXLE\_EST}$, $N_{A\_EST}$, $N_{B\_EST}$, $N_{O\_EST}$, $N_{E\_EST}$, and $N_{WHL}$, based upon the input parameters. A first speed matrix comprising the estimated speeds $N_{A\_EST}$, $N_{B\_EST}$, $N_{O\_EST}$, $N_{E\_EST}$, $N_{WHL\_EST}$ is subtracted from a second speed matrix comprising measured speeds $N_A$, $N_B$, $N_O$, $N_E$, $N_{WHL}$ output from driveline dynamic control 230. The resultant matrix is input to an estimator 232, wherein it is multiplied by one of a plurality of gain matrices, to determine a matrix of estimated state corrections. Each of the gain matrices comprises a matrix of scalar gain factors, preferably determined for each transmission operating mode, i.e. the specific operating mode and gear configuration, described hereinabove with reference to Table 1. In this embodiment the gain matrices are determined off-line, and stored as calibration values in one of the on-board controllers. There are preferably at least two sets of gain matrices developed and executed as part of the estimator feedback gain 232 action, wherein one set is for use when the driveline is in a neutral lash state, and one set is for use when the driveline is in a drive state.

The matrix of estimated state corrections is used as feedback by the driveline dynamics estimator 240 in determining the dynamically calculated estimated output states of the driveline, including $T_{DAMP\_EST}$, $T_{AXLE\_EST}$, $N_{A\_EST}$, $N_{B\_EST}$, $N_{O\_EST}$, $N_{E\_EST}$, $N_{WHL\_EST}$ based upon the input parameters. When the first speed matrix comprising the estimated speeds is equal to the second speed matrix comprising measured speeds, it is determined that the outputs of the estimator, comprising $T_{DAMP\_EST}$, $T_{AXLE\_EST}$, $N_{A\_EST}$, $N_{B\_EST}$, $N_{O\_EST}$, $N_{E\_EST}$, $N_{WHL\_EST}$ are accurate measurements of actual operating states of the driveline.

Figure 5:
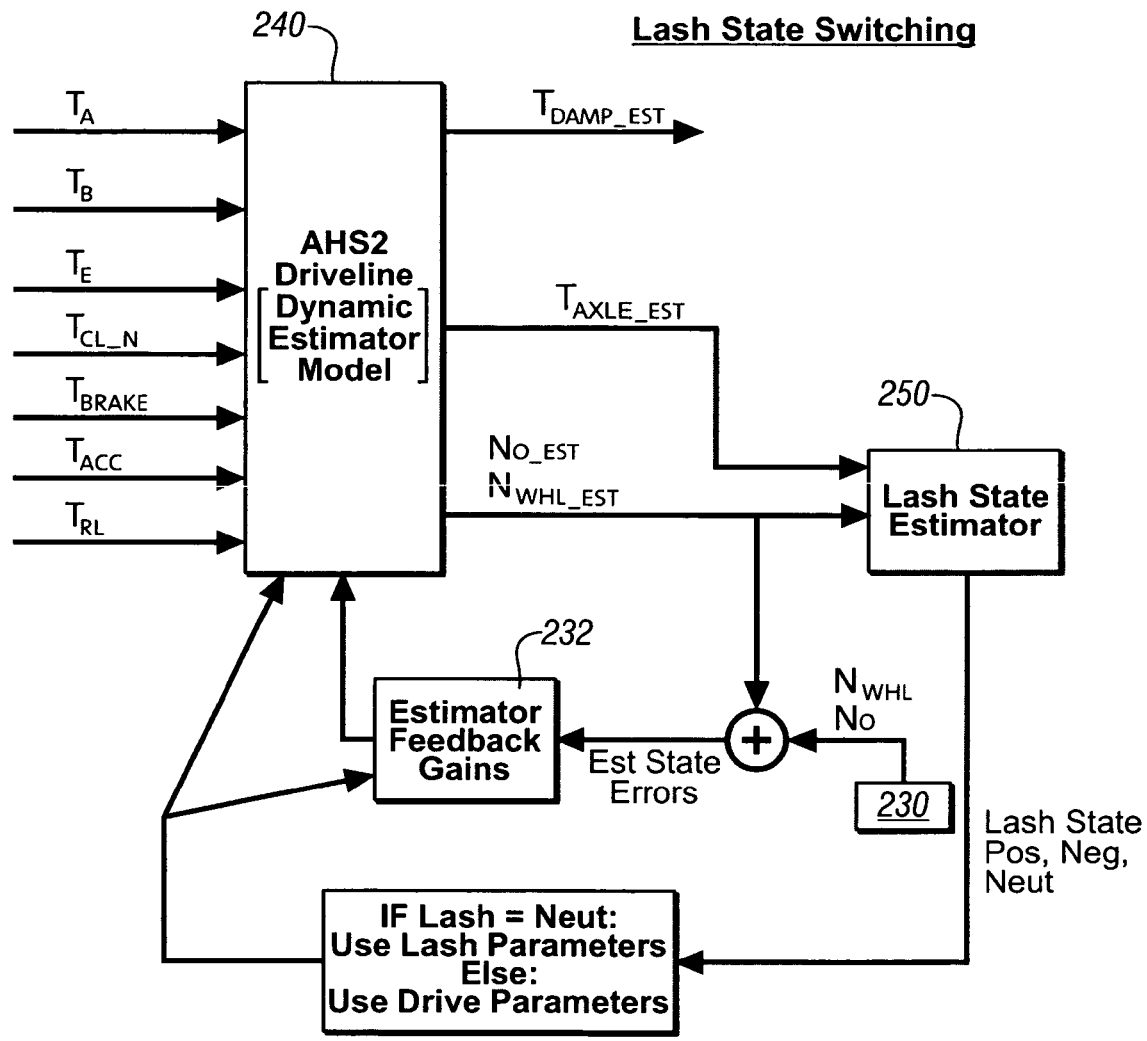
Figure 6:
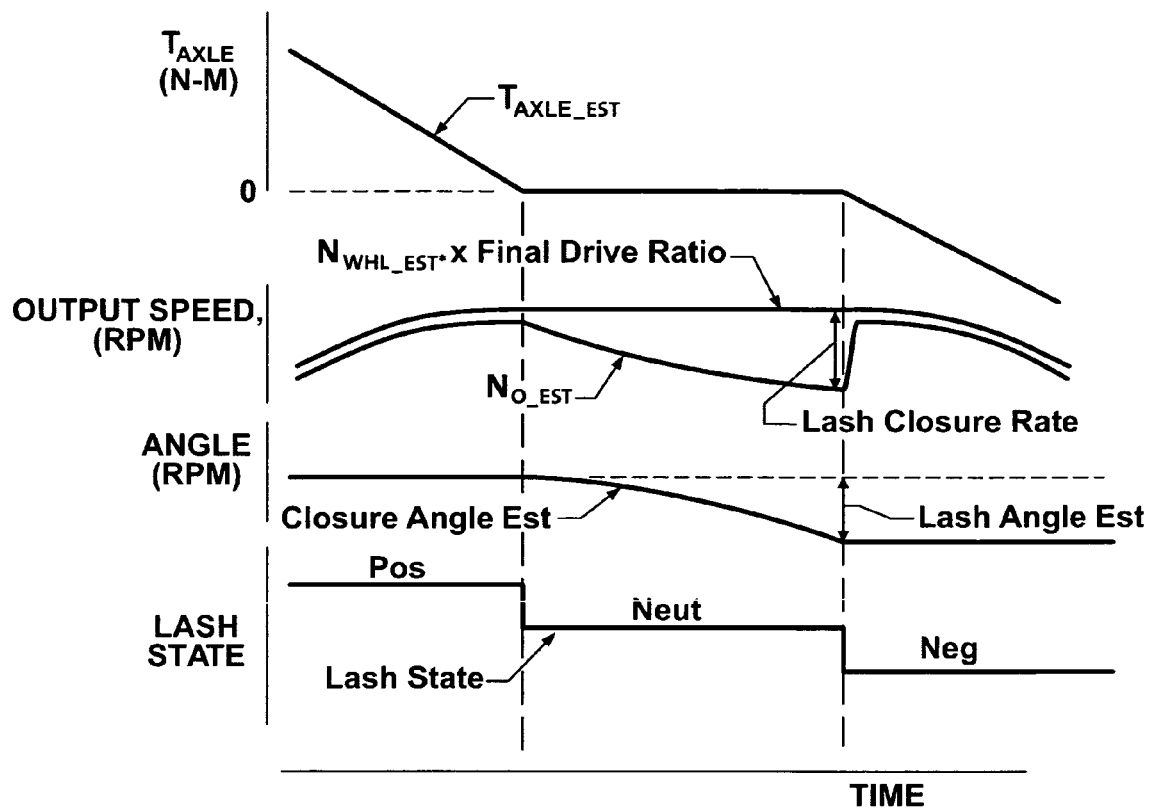
Figure 7:
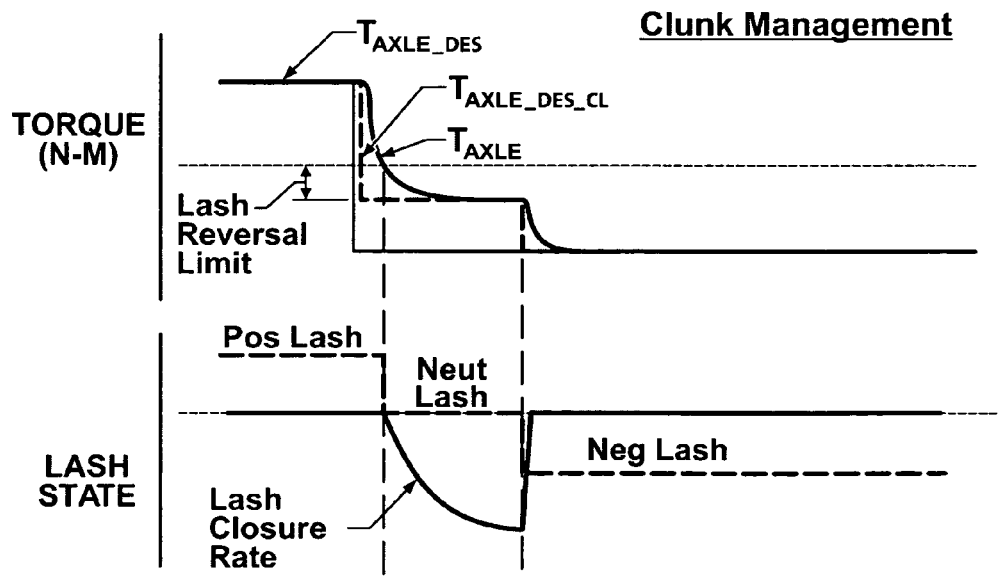

Referring now to FIG. 5 through 7, a method to control torque transmitted from the powertrain system described with reference to FIGS. 1 and 2 during transitions resulting in driveline lash, and clunks, is described in detail. The method and system described herein are executed as one or more algorithms in the distributed controller architecture shown with reference to FIG. 2, and utilize the multivariate feedback control scheme described with reference to FIG. 3, including parameter state estimation described with reference to FIG. 4. The overall method comprises monitoring magnitude of powertrain torque transmitted to the driveline, i.e. $T_{AXLE}$, output speed of the transmission, $N_O$, to the driveline, and driven wheel speed, $N_{WHL}$. A lash state is determined, and each of the torque-generative devices of the powertrain is controlled based upon the lash state. In this embodiment, the lash state is determined using an estimator 250, which preferably comprises an algorithm within the control system. Inputs to the lash state estimator 250 include estimated axle torque, $T_{AXLE\_EST}$, estimated output speed of the transmission, $N_{O\_EST}$, and estimated driven wheel speed, $N_{WHL\_EST}$, each of which is output from the driveline dynamics estimator 240. The lash state estimator 250 is operable to compare the estimated axle torque, $T_{AXLE\_EST}$ and estimated output speed, $N_{O\_EST}$, to determine the lash state to be one of a positive state, a negative state, or a neutral state. The positive state is indicated when the estimated axle torque, $T_{AXLE\_EST}$ and estimated output speed, $N_{O\_EST}$, and estimated driven wheel speed, $N_{WHL\_EST}$, show torque being transmitted from the transmission through the driveline in a forward direction. The negative state is indicated when the estimated axle torque, $T_{AXLE\_EST}$ and estimated output speed, $N_{O\_EST}$ and estimated driven wheel speed, $N_{WHL\_EST}$, show torque being transmitted from the transmission through the driveline in a negative direction. The neutral state is indicated when there is substantially no torque being transmitted between the driven wheels and the driveline through the transmission, i.e. the driveline axle torque is substantially equal to a nil torque value.

When output of the lash state estimator indicates a positive lash state or a negative lash state, no action occurs in the control system based upon the lash.

When output of the lash state estimator indicates a neutral state, the resultant matrix comprising the aforementioned difference between the first speed matrix comprising estimated speeds and the second speed matrix comprising measured speeds is multiplied by the gain matrix in the estimator feedback gain 23 for use when the driveline is in the neutral lash state.

When the matrix of estimated state corrections for lash operation is used in the driveline dynamics estimator 240, the resultant outputs of the estimator 240, comprising $T_{DAMP\_EST}$, $T_{AXLE\_EST}$, $N_{A\_EST}$, $N_{B\_EST}$, $N_{O\_EST}$, $N_{E\_EST}$, and $N_{WHL\_EST}$, are provided as feedback for use with multivariate motor damping control 220. The multivariate motor damping control 220 uses the estimator outputs to dampen actual axle torque output, $T_{AXLE}$ during the period of time in which the neutral lash state is detected. Damping of axle torque output, $T_{AXLE}$ is preferably accomplished by controlling a time-rate transfer of electrical energy between one of the electrical motors 56, 72 and the electrical energy storage device 74 by moderating flow of electrical current through the power inverters and motor controllers of TPIM 19, i.e. controlling the time-rate transfer of electrical energy.

Alternatively, damping of axle torque output, $T_{AXLE}$ may be accomplished by moderating torque input to the transmission 10 from the internal combustion engine 14 through shafts 18 and 12, using known engine control strategies. Thus, the torque transmitted to the driveline, $T_{AXLE}$ is less than operator-commanded torque, $T_{AXLE\_DES}$ when the lash state is neutral. When the lash state subsequently becomes either positive or negative, use of the lash gain matrices is discontinued, and a gain matrix is selected as previously described with reference to FIG. 4.

Results showing the action described hereinabove are shown with reference now to FIG. 6. When estimated axle torque, $T_{AXLE\_EST}$ is determined to be substantially equal to zero, the lash state changes from a positive lash to neutral lash. The controller is able to determine when the lash event ends, i.e. when the neutral lash state ends, based upon the estimated wheel speed multiplied by a final drive ratio of the transmission and driveline, estimated output speed, and the estimated lash angle, from which a lash closure rate is determinable. An estimated closure angle is also determinable. The controller can control torque outputs from Motor A 56 and Motor B 72, based upon the closure rate. Controlling torque outputs from the electric motors is typically accomplished by controlling the rate and magnitude of electrical energy transferred from the ESD 74 to one or both electric motors 56, 72.

Referring now to FIG. 7, when the lash control scheme is used to manage clunk, i.e. driveline noise, the lash event is monitored, as described above. Desired axle torque, $T_{AXLE\_DES}$ is determined, and adjusted to reach a clunk-limited desired axle torque, which is implemented during a neutral lash event. Lash closure rate can be limited to a maximum value, an exemplary value which is shown in FIG. 7 being four radians per second. This action provides that a rate of change in the actual axle torque will be less than the desired rate of change, thus limiting clunk or noise. The torque limitation is preferably accomplished by controlling damping torque values for Motor A and Motor B, $T_{A\_DAMP}$ and $T_{B\_DAMP}$, calculated with reference to the multivariate motor damping torque control 220, previously referenced and described. The multivariate motor damping control 220 uses the estimator outputs to dampen actual axle torque output, $T_{AXLE}$. Thus, the torque transmitted to the driveline, $T_{AXLE}$ is less than operator-commanded torque, $T_{AXLE\_DES}$ when the desired axle torque is clunk-limited.

Each of the plurality of lash gain matrices used in estimator feedback gain block 232 comprises a matrix of scalar gain factors, preferably determined for each transmission operating mode, i.e. the specific operating mode and gear configuration, described hereinabove with reference to Table 1. In this embodiment the lash gain factors are determined off-line, and stored as calibration values in one of the on-board controllers. Furthermore, duration of use of the lash gain factor may be limited to a predetermined elapsed time. In this manner the multivariate feedback control scheme is useable to manage and suppress magnitude and occurrence of driveline clunks.

Although this embodiment has been described as controlling output of the electric motors, it is understood that alternate embodiments of this invention can include control schemes which are operable to control the torque output of the internal combustion engine as well as the electric motors. It is further understood that some or all of the estimated values for torque and speed can instead be monitored directly with sensors and sensing schemes.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Method for controlling torque transmitted between a powertrain system and a driveline, the powertrain system comprising a plurality of torque-generative devices operably connected to a transmission, comprising:
   determining a driveline axle torque;
   determining an output speed of the powertrain and an output speed of a driven wheel of the driveline;
   determining a lash state of the driveline to be one of a positive state, a negative state, and a neutral state based upon the driveline axle torque and the output speeds of the powertrain and the driven wheel of the driveline;
   determining the lash state to be the neutral state when the driveline axle torque is substantially equal to a nil torque value; and
   controlling the torque-generative devices such that a rate of change of the driveline axle torque transmitted between the powertrain system and the driveline is less than an operator-commanded rate of change of the driveline axle torque when the lash state is the neutral state.

2. The method of claim 1, further comprising controlling the torque-generative devices such that the rate of change of the driveline axle torque transmitted between the powertrain system and the driveline is less than the operator-commanded rate of change of the driveline axle torque for a period of time.

3. The method of claim 1, wherein determining the driveline axle torque comprises estimating the driveline axle torque based upon the output speeds of the powertrain and the driven wheel.

4. The method of claim 1, wherein determining the output speed of the powertrain comprises measuring an output speed of the transmission device.

5. The method of claim 1, wherein determining the output speed of the driven wheel comprises measuring wheel speed with a sensor.

6. The method of claim 5, wherein determining output speed of the driven wheel further comprises measuring wheel speeds of a plurality of driven wheels, and determining an average value for wheel speed therefrom.

7. The method of claim 1, wherein determining the output speed of the powertrain and the output speed of the driven wheel of the driveline comprises estimating the output speed of the transmission of the powertrain and the output speed of the driven wheel based upon measured operating parameters.

8. Method for controlling torque transmitted between a powertrain system and a driveline, the powertrain system comprising a plurality of torque-generative devices operably connected to a transmission, comprising:
   determining a driveline axle torque;
   determining an output speed of the powertrain and an output speed of a driven wheel of the driveline; and
   determining a lash state of the driveline to be one of a positive state, a negative state, and a neutral state based upon the driveline axle torque and the output speeds of the powertrain and the driven wheel of the driveline; and
   selecting a gain matrix for a multivariate feedback control system operable to control each of the torque-generative devices based upon the lash state.

9. The method of claim 8, comprising selecting the gain matrix for the multivariate feedback control system operable to control the plurality of torque-generative devices such that driveline axle torque transmitted between the powertrain system and the driveline is less than an operator-commanded torque when the lash state is the neutral state.

10. The method of claim 9, further comprising controlling the torque-generative devices such that the driveline axle torque transmitted between the powertrain system and the driveline is less than the operator-commanded torque for a period of time.

11. The method of claim 10, wherein monitoring powertrain torque transmitted between the powertrain system and the driveline comprises measuring torque with a sensor.

12. The method of claim 10, wherein monitoring powertrain torque transmitted between the powertrain system and the driveline comprises estimating torque transmitted to the driveline.

13. Article of manufacture, comprising a storage medium having a computer program encoded therein for effecting a method to control torque transmitted between a powertrain and a driveline, the powertrain system comprising a plurality of torque-generative devices operably connected to a transmission, the program comprising:
   code to determine a driveline axle torque;
   code to determine an output speed of the powertrain and an output speed of a driven wheel of the driveline;
   code to determine a lash state of the driveline to be one of a positive state, a negative state, and a neutral state, based upon the driveline axle torque and the output speeds of the powertrain and the driven wheel of the driveline; and
   code to control the torque-generative devices based upon the lash state, comprising;
      code to determine the lash state to be the neutral state when the driveline axle torque is substantially equal to a nil torque value; and
      code to control the torque-generative devices such that a rate of change of the driveline axle torque transmitted between the powertrain system and the driveline is less than an operator-commanded rate of change of the driveline axle torque when the lash state is the neutral state.

14. The article of manufacture of claim 13, wherein the plurality of torque-generative devices comprises a first and a second electric machine.

15. The article of manufacture of claim 14, wherein the driveline and the first and second electric machines are operable to transmit torque therebetween by way of the transmission.

16. The article of manufacture of claim 15, wherein the code to control the torque-generative devices based upon the lash state further comprises code to control a time-rate transfer of electrical energy between one of the electric machines and an electrical energy storage device.

17. The article of manufacture of claim 16, wherein the code to control the plurality of torque-generative devices of the powertrain based upon the lash state further comprises code to control torque output from one of the electric machines.

18. The article of manufacture of claim 16, wherein the code to control the plurality of torque-generative devices of the powertrain based upon the lash state further comprises code to control electrical energy generated by one of the electric machines.

19. The article of manufacture of claim 14, wherein the plurality of torque-generative devices further comprises an internal combustion engine.

20. Method for controlling a powertrain, the powertrain comprising an electric machine operably connected to a transmission device including an output member operably connected to a driveline including a driven wheel, comprising:
   determining an axle torque of the driveline;
   determining speeds of the transmission output member and the driven wheel of the driveline;
   commanding the electric machine to transition between a torque-generating operating condition and an electrical-generating operating condition;
   determining a lash state of the driveline to be one of a positive state, a negative state, and a neutral state based upon the driveline axle torque and the speeds of the transmission output member and the driven wheel of the driveline;
   determining the lash state to be the neutral state when the driveline axle torque is substantially equal to a nil torque value; and,
   controlling the electric machine such that a rate of change of the driveline axle torque is less than an operator-commanded rate of change of the driveline axle torque when the lash state is the neutral state.

21. The method of claim 20, wherein the powertrain device further comprises an internal combustion engine, and, a second electric machine, each operably connected to the transmission device.

22. Method for controlling torque transmitted between a powertrain system and a driveline, the powertrain system comprising a plurality of torque-generative devices operably connected to a transmission, comprising:
   estimating axle torque;
   determining an output speed of the powertrain and an output speed of a driven wheel of the driveline;
   determining a lash state of the driveline to be one of a positive state, a negative state, and a neutral state based upon the estimated axle torque and the output speeds of the powertrain and the driven wheel of the driveline;
   determining the lash state to be the neutral state when the estimated axle torque is substantially equal to a nil torque value; and
   controlling the torque-generative devices such that a rate of change of the axle torque transmitted from the powertrain system is less than an operator-commanded rate of change of the axle torque when the lash state is the neutral state.

* * * * *